(12) United States Patent
West

(10) Patent No.: US 9,124,720 B2
(45) Date of Patent: Sep. 1, 2015

(54) DRIVING CANNOT TEXT NONCONTROLLING CELL PHONE APP SYSTEM AND METHOD

(71) Applicant: Lisa Marie West, Attleboro, MA (US)

(72) Inventor: Lisa Marie West, Attleboro, MA (US)

( * ) Notice: Subject to any disclaimer, the term of this patent is extended or adjusted under 35 U.S.C. 154(b) by 100 days.

(21) Appl. No.: 13/970,389

(22) Filed: Aug. 19, 2013

(65) Prior Publication Data

US 2015/0050966 A1 Feb. 19, 2015

(51) Int. Cl.
*H04M 1/725* (2006.01)
*H04M 1/23* (2006.01)

(52) U.S. Cl.
CPC ...... *H04M 1/72577* (2013.01); *H04M 1/72552* (2013.01); *H04M 1/236* (2013.01); *H04M 1/7253* (2013.01)

(58) Field of Classification Search
CPC ......... H04W 4/14; H04W 4/12; H04W 8/245; H04W 8/265; H04M 1/72552; H04M 1/6075; H04M 2250/02; H04M 3/42382; H04L 12/5895
USPC ............... 455/569.2, 418, 419, 466
See application file for complete search history.

(56) References Cited

U.S. PATENT DOCUMENTS

| | | | |
|---|---|---|---|
| 2011/0102146 A1* | 5/2011 | Giron | 340/7.62 |
| 2011/0177800 A1* | 7/2011 | Gilson | 455/417 |
| 2012/0058755 A1* | 3/2012 | Olincy et al. | 455/417 |
| 2012/0058756 A1* | 3/2012 | Olincy et al. | 455/417 |
| 2012/0064924 A1* | 3/2012 | Schapsis et al. | 455/466 |
| 2014/0057610 A1* | 2/2014 | Olincy et al. | 455/414.1 |

* cited by examiner

*Primary Examiner* — Kashif Siddiqui
*Assistant Examiner* — Obidon Bassinan

(57) ABSTRACT

A non-intrusive cellular phone app eliminates a need for the driver to respond to a received text message while driving. The app does not interfere with the normal functioning of the cellular phone. The app sends an immediate response text message to a sender of a received text message that the owner of the cellular phone is driving and can't text. The app notifies the driver of the identity of the sender only by any of a variety of means, most of which do not require the attention or the action of the driver. Action by the driver may be taken later under safe conditions using the normal functioning of the cellular phone.

16 Claims, 7 Drawing Sheets

DRIVING CANNOT TEXT NONCONTROLLING CELL PHONE APP SYSTEM AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to a cellular phone application for driver safety and in particular to a non-intrusive programmed application (app) system and method for a cellular phone of a driver to eliminate a need for the driver to respond to a received text message while driving, the system not interfering with the normal functioning of the cellular phone.

2. Description of Related Art Including Information Disclosed Under 37 CFR 1.97 and 1.98

Texting or using SMS (Short Message Service) involves reading and or writing up to 160 characters on a small screen and using a very small keyboard to type. Texting and driving kills. In 2011, 3,331 people were killed in crashes involving a distracted driver and an additional, 387,000 people were injured in motor vehicle crashes involving a distracted driver. One in five of these deaths and injuries were attributed to texting and driving. Texting and driving is the greatest single cause of driving deaths, even more than drunken driving. A number of drivers of public transportation vehicles, including trains and buses have caused many deaths in a single accident because of texting while operating the vehicle. A person texting and driving is 23 times more likely to be in an accident.

Texting and driving is the most dangerous distraction while driving because it involves the eyes, hands, and mind. It takes an average of 4.5 seconds just to read a text. In that time a vehicle traveling at 55 MPH travels 100 yards. That is the length of a football field driving blind and usually holding the cellphone with both hands and reading and writing and thinking about the text messages. Half of commuting adults and half of teenage drivers admit to texting while driving on a regular basis.

While 96% to 98% of drivers admit that driving and texting is dangerous, still about half of the drivers text and drive. Some people consider texting and driving a habit, just part of multi-tasking to save time.

While there have been a number of attempts to solve the texting and driving problem, most involve shutting down all or some of the functions of a driver's cell phone. Many complaints are made about prior art attempts which disrupt the functioning of their cell phones, especially when the prior art solutions malfunction and disrupt operation of the cell phones even when the person is not driving. People generally do not like any messing with the normal functioning of their cellular phones, which people increasingly depend upon.

The prior art fails to provide an effective means for eliminating the need for a driver to read and/or respond to a text message while driving the vehicle, without inferring with the normal operation of the driver's cell phone.

Ten U.S. patents and two published U.S. patent applications were found related to your invention. None are identical to your DCT invention as far as the details and operation of your invention. So your DCT invention would be patentable over the prior patents found in the search. Your DCT invention makes more sense than most of the other inventions in the patents in terms of how people actually behave with cell phones and the many complaints people have made about how the existing driving and texting apps screw up their phones. They don't want the functions of their phones shut down. Six of the patents found were the same invention by the same two people, Olincy and Fish, but they each claim the same invention in different ways or claim different types of claims for the same invention. Their use of a specific button on the phone or use of existing buttons on the phone together for their invention is always using the button to send an automatic response to an incoming call, or Email, or text message. The button is not used for turning the program on and the program does not send an automatic return message without pushing the button.

U.S. Pat. No. 8,364,183, issued Jan. 31, 2013 to Olincy et al, provides an "I am driving/busy" automatic response system for mobile phones wherein a cell phone which has been modified by the addition of software which responds to the press of one or more Busy keys by automatically sending a pre-typed text message to the sender of the latest text message just received or automatically answering an incoming call immediately upon pressing the Busy key and playing a pre-recorded audio message. The outgoing text or audio message can inform the sender of the incoming text or the caller that the user is driving or otherwise engaged and cannot respond immediately. In some embodiments, one or more Busy keys can be added keys or one or more existing keys on the cell phone or on the keypad of the cell phone or on a touchscreen or a visual depiction of a keypad on a touchscreen of the cell phone.

U.S. Pat. No. 8,249,627, issued Aug. 21, 2012 to Fish and Olincy, discloses an "I am driving/busy" automatic response system for mobile phones wherein a cell phone which has been modified by the addition of software which responds to the press of one or more Busy keys by automatically sending a pre-typed text message to the sender of the latest text message just received or automatically answering an incoming call immediately upon pressing the Busy key and playing a pre-recorded audio message. The outgoing text or audio message can inform the sender of the incoming text or the caller that the user is driving or otherwise engaged and cannot respond immediately. In some embodiments, one or more Busy keys can be added keys or one or more existing keys on the cell phone or on the keypad of the cell phone or on a touchscreen or a visual depiction of a keypad on a touchscreen of the cell phone.

U.S. Pat. No. 8,335,497, issued Dec. 18, 2012 to Olincy et al, indicates an "I am driving/busy" automatic response system for mobile phones wherein a cell phone which has been modified by the addition of software which responds to the press of one or more Busy keys by automatically sending a pre-typed text message to the sender of the latest text message just received or automatically answering an incoming call immediately upon pressing the Busy key and playing a pre-recorded audio message. The outgoing text or audio message can inform the sender of the incoming text or the caller that the user is driving or otherwise engaged and cannot respond immediately. In some embodiments, one or more Busy keys can be added keys or one or more existing keys on the cell phone or on the keypad of the cell phone or on a touchscreen or a visual depiction of a keypad on a touchscreen of the cell phone.

U.S. Pat. No. 8,412,161, issued Apr. 2, 2013 to Olincy et al, puts forth an "I am driving/busy" automatic response system for mobile phones wherein a cell phone which has been modified by the addition of software which responds to the press of one or more Busy keys by automatically sending a pre-typed text message to the sender of the latest text message just received or automatically answering an incoming call immediately upon pressing the Busy key and playing a pre-recorded audio message. The outgoing text or audio message can inform the sender of the incoming text or the caller that the user is driving or otherwise engaged and cannot respond immediately. In some embodiments, one or more Busy keys can be added keys or one or more existing keys on the cell phone or on the keypad of the cell phone or on a touchscreen or a visual depiction of a keypad on a touchscreen of the cell phone.

U.S. Pat. No. 8,315,597, issued Nov. 20, 2012 to Olincy et al, is for an "I am driving/busy" automatic response system for mobile phones wherein a cell phone system which has been modified by the addition of software and hardware to determine the speed of at least phones to which incoming text messages are directed and determine whether or not to send an automated text message response to the sender indicating the user to which the text is directed cannot respond immediately. If such a response message is to be sent, automatically generating and sending said text message. If not, forwarding the text message to the cell phone to which it is directed.

U.S. Pat. No. 8,359,014, issued Jan. 22, 2013 to Olincy et al, concerns a cell phone which has been modified by the addition of software which responds to the press of one or more Busy keys by automatically sending a pre-typed text message to the sender of the latest text message just received or automatically answering an incoming call immediately upon pressing the Busy key and playing a pre-recorded audio message. The outgoing text or audio message can inform the sender of the incoming text or the caller that the user is driving or otherwise engaged and cannot respond immediately. In some embodiments, one or more Busy keys can be added keys or one or more existing keys on the cell phone or on the keypad of the cell phone or on a touchscreen or a visual depiction of a keypad on a touchscreen of the cell phone. In some embodiments, only the text of the automated reply message is entered automatically, and all other commands to launch the SMS service, select the text message to reply to and send the automated reply message are manually given.

U.S. Pat. No. 8,320,884, issued Nov. 27, 2012 to Khanna et al, claims a user device which receives information associated with the user device, and detects movement of the user device. The user device also determines whether the movement is greater than a threshold velocity, and determines, when the movement is greater than the threshold velocity, whether the user device is located in a moving motor vehicle based on the information associated with the user device. The user device further places functionality of the user device in a semi-locked state when the user device is located in a moving motor vehicle.

U.S. Pat. No. 8,401,589, issued Mar. 19, 2013 to Liu et al, provides controlled text-based communication on mobile devices wherein devices, systems, and methods are disclosed for managing text-based services on mobile devices during the operation of a vehicle. Proactive service-controls use a time of day and location based services to determine that a mobile device is in a moving vehicle. Reactive position-awareness techniques use near-field communication (NFC) to determine that the mobile device is being operated by a user in a driver's seat of the vehicle. Upon satisfying both these determinations, specific text-based services such as messaging, browsing, etc. can be disabled by either the mobile device itself or by a network entity. The present invention can also be extended to managing other mobile device's usages in vehicles, including phone calls, online gaming, etc.

U.S. Pat. No. 7,898,428, issued Mar. 1, 2011 to Dietz et al, shows a mobile device configured to have at least one function disabled when a speed of the mobile device exceeds a threshold. The mobile device includes an output component configured to provide a notification related to disabling the at least one function. The mobile device also includes a first input component configured to promote controlling whether to disable the at least one function.

U.S. Pat. No. 6,799,034, issued Sep. 28, 2004 to Higuchi et al, describes a cellular mobile telephone apparatus having circuits for generating messages, a storage circuit for storing messages, and transmitter/receiver circuit or transmitting a message. When the user of the cellular mobile telephone apparatus cannot immediately respond to an incoming call, a desired one of a plurality of previously generated and stored messages can be transmitted to a calling party through simple key manipulations or by other means.

U.S. Patent Application #20120329444, published Dec. 27, 2012 to Osann, describes systems and methods are to allow safe texting with speech-text conversion for vehicle drivers, with provisions to prevent a user from defeating or bypassing the speech-text conversion. Some embodiments include a special software application in a driver's phone while other embodiments require only software changes at a service provider. If the velocity of a phone exceeds a disable threshold, it is assumed that the user may be texting while driving. That the user is a driver is then determined by one or more of multiple methods including registration. Conventional texting is then disabled for their phone and a safe texting capability is enabled instead. Where persons in the same vehicle utilize different service providers, parameters such as for instance cell phone position, velocity, and direction of travel are time stamped and passed between service providers or alternately made available to other service providers via a central database.

U.S. Patent Application #20080143548, published Jun. 19, 2008 by Grimmelmann et al, claims a method of enabling one or more senders to simultaneously alert one or more contacts located anywhere around the world over one or more communication networks, each contact having at least one communication device for receiving alert data. The method including the steps of generating and maintaining one or more scenarios each including a set of destination contacts selected from the one or more contacts, a composition of alert data, and delivery rules; initiating execution of at least one of the scenarios to send the alert data to each contact in the set of destination contacts; and managing sending of the alert data by applying the delivery rules.

What is needed is a means for eliminating the need for a driver to read and/or respond to a text message while driving the vehicle without inferring with the normal operation of the driver's cell phone.

BRIEF SUMMARY OF THE INVENTION

An object of the present invention is to provide an app program means for eliminating the need for a driver to read and/or respond to a text message while driving the vehicle without inferring with the normal operation of the driver's cell phone.

Another object of the present invention is to provide a text message response system which does not interfere with the normal functioning of the cellular phone.

An added object of the present invention is to provide an app program means which may be turned on after receiving a text message to send an immediate response text message to a sender of the received text message to notify the sender that the text message was received and cannot immediately be responded to personally.

In brief, the present invention provides a non-intrusive programmed application (app) system and method for a cellular phone of a driver to eliminate a need for the driver to respond to a received text message while driving, the system not interfering with the normal functioning of the cellular phone. The app sends an immediate response text message to a sender of a received text message on the driver's cellular phone that the owner of the cellular phone is driving and can't text. The app notifies the driver of the identity of the sender only by any of a variety of means, most of which do not require the attention or action of the driver. The driver may respond later, or take a reasonable amount of time to pull over and stop to read the received text message using the normal functioning of the cellular phone and respond directly to the sender by sending another response text message or an email or by calling the sender or using another means to respond to the sender using the normal functioning of the cellular phone. If an emergency situation exists requiring immediate attention, the driver may call the sender using the normal functioning of the cellular phone (preferably only when that is not illegal in the location of the driver). All the normal functions of the cellular phone are available for use by the driver, but the instant response message of "Driving, can't text" or other desired response message eliminates the need for the driver to respond immediately, so that the driver has time to read the text and respond after taking necessary safety precautions, such as pulling over and stopping the vehicle or waiting until reaching the travel destination and stopping.

An advantage of the present invention is that it provides a means for eliminating the need for a driver of a vehicle to respond immediately to a text message received on the driver's cellular phone.

Another advantage of the present invention is that it provides a text message response system which does not interfere with the normal functioning of the cellular phone so the cellular phone owner has full access to all functions at all times, which the driver can use at a convenient time in a safe situation.

An added advantage of the present invention is that it provides an app program means which may be turned on after receiving a text message to send an immediate response text message to a sender of the received text message to notify the sender that the text message was received and cannot immediately be responded to personally.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings:

FIG. 3 is an elevational view of the front screen face of the cellular phone showing the recessed activation button for the app of the present invention attached to the top of the cellular phone and showing the various types of notifications that the app is turned on;

DETAILED DESCRIPTION OF THE INVENTION

In FIGS. 1A-6, the present invention provides a non-intrusive programmed application (app) system and method 20 used on a cellular phone 60 of a driver to eliminate a need for the driver to respond to a received text message while driving, the system not interfering with the normal functioning of the cellular phone.

Figure 1A:
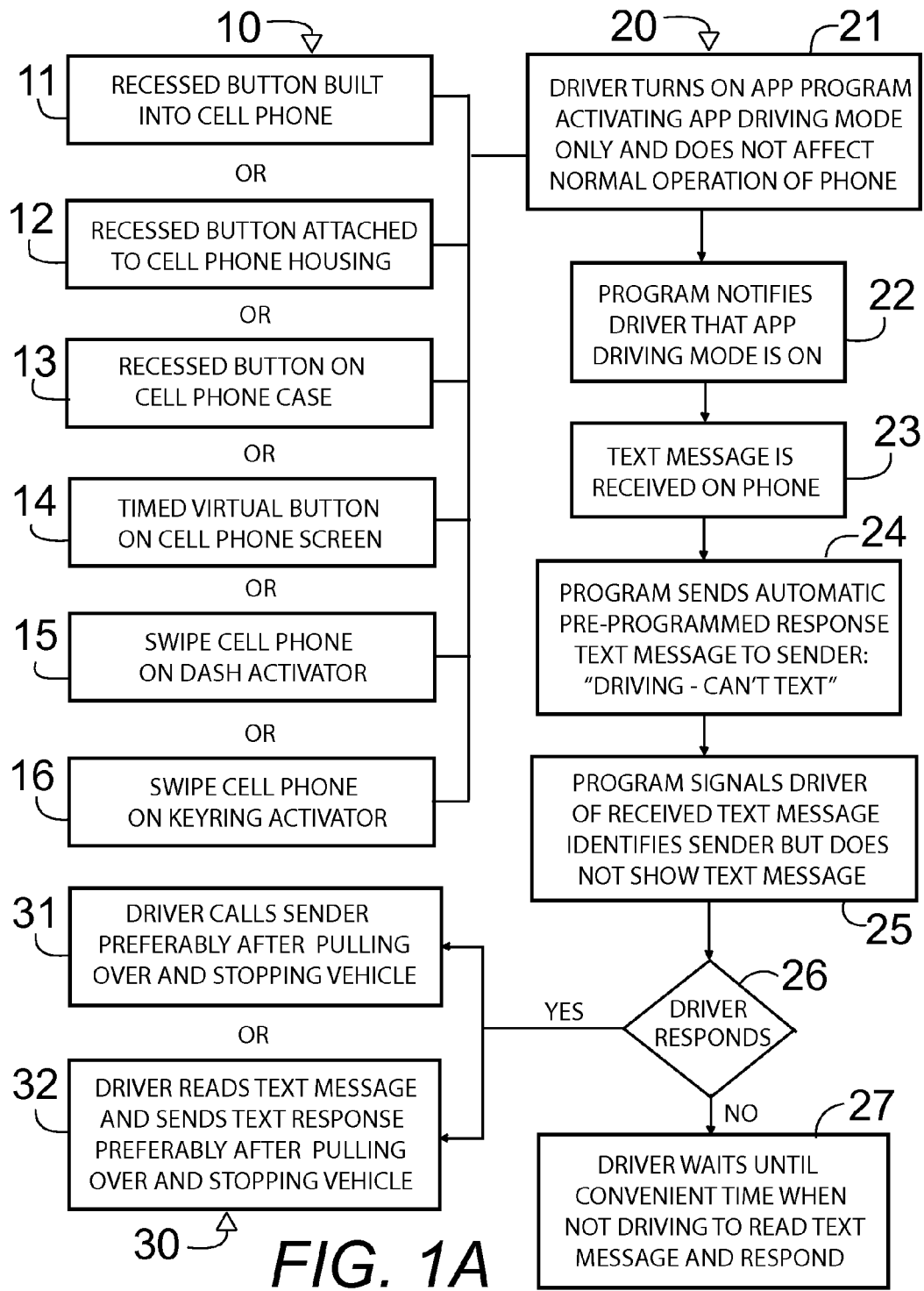
FIG. 1A is a diagrammatic view of the system components and operation steps of the system and method of the present invention, wherein the cellular phone app of the present invention is turned on prior to driving and prior to receiving a text message while driving.
Figure 1B:
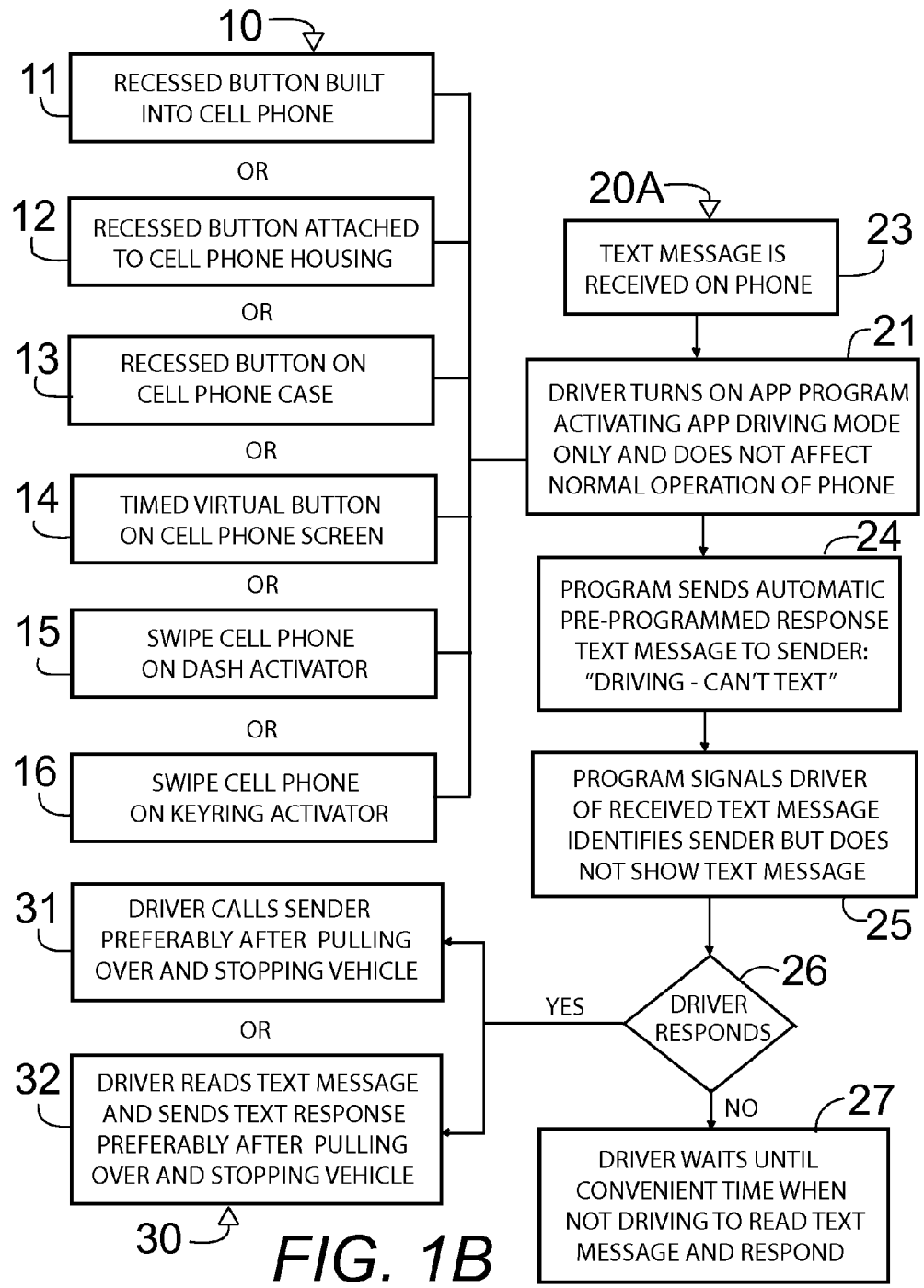
FIG. 1B is a diagrammatic view of the system components and operation steps of the system and method of the present invention, wherein the cellular phone app of the present invention is turned on after receiving a text message.

The system comprises the following components:

In FIGS. 1A and 1B, any of a variety of means for activating 20 a programmed "driving can't text" application (app) on a driver's cellular phone to put the app in a driving mode to eliminate a need for a driver to respond to a received text message while driving, the app not interfering with the normal operation of the cellular phone. The means for activating a programmed "driving can't text" application (app) on a driver's cellular phone needed to put the app in a driving mode comprises at least one activation means taken from the list of activation means including a built-in tension press recessed button 40 (shown in FIG. 2) built into the cellular phone 60, a phone-attached tension press recessed button 40A in a raised button casing (shown in FIG. 3) attached to the cellular phone 60, a case-attached tension press recessed button 40B (either attached in a raised button casing or built-in as shown in FIG. 4) on a cellular phone case 50, a timed touch virtual button 49D (shown in FIG. 2) on a cellular phone screen 63, a swipe activation device 49A (shown in FIG. 5) attached to the cellular phone 60 or the phone case 50 swiped by a mating swipe activation device 49B on a dashboard 70 or swiped by a mating swipe activation device 49B on a keychain 80 using radio frequency technology between the swiping devices.

Figure 2:
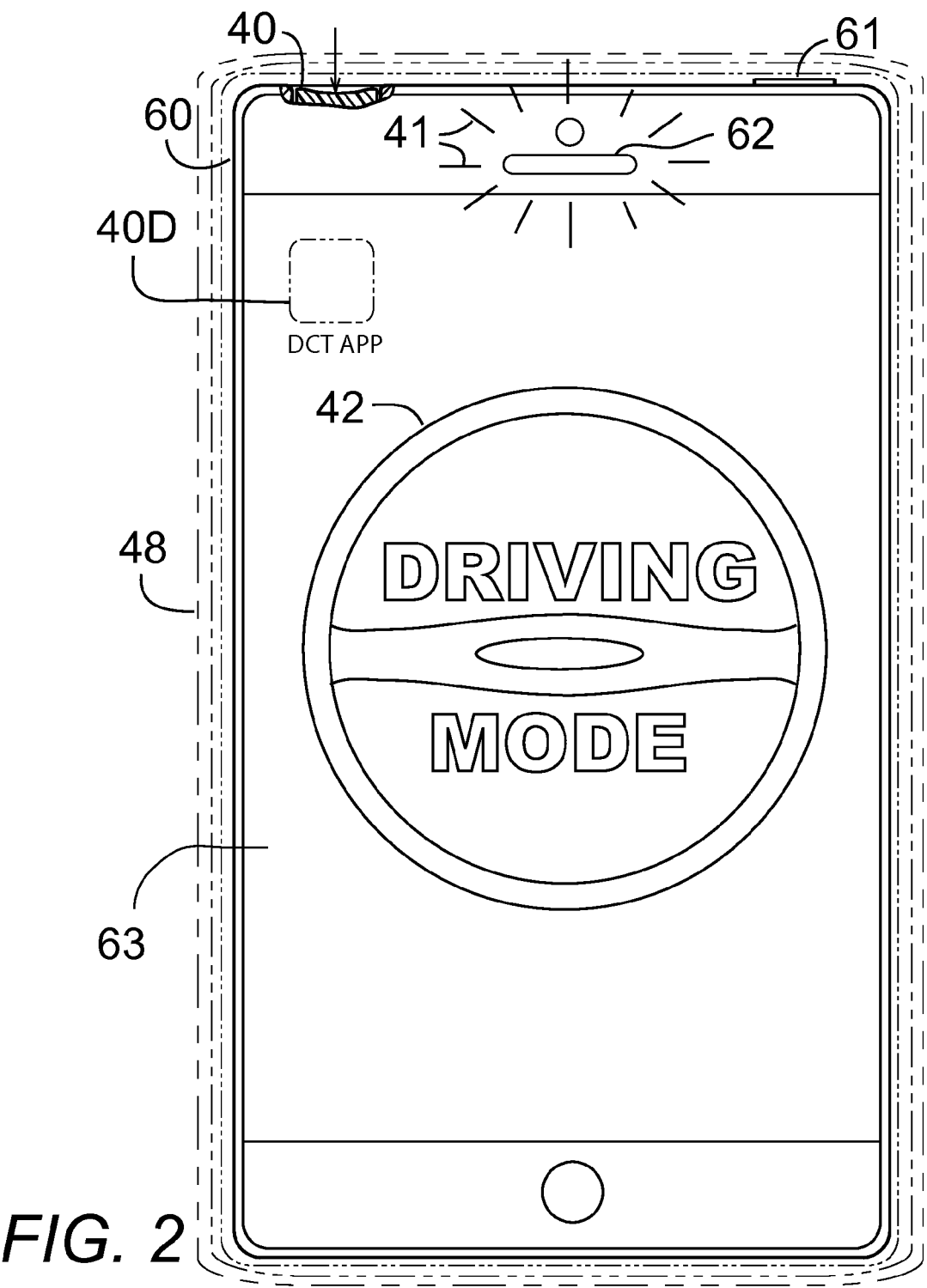
FIG. 2 is an elevational view of a front screen face of a cellular phone showing the recessed activation button for the app of the present invention built into the top of the cellular phone and showing the various types of notifications that the app is turned on in the driving mode.
Figure 3:
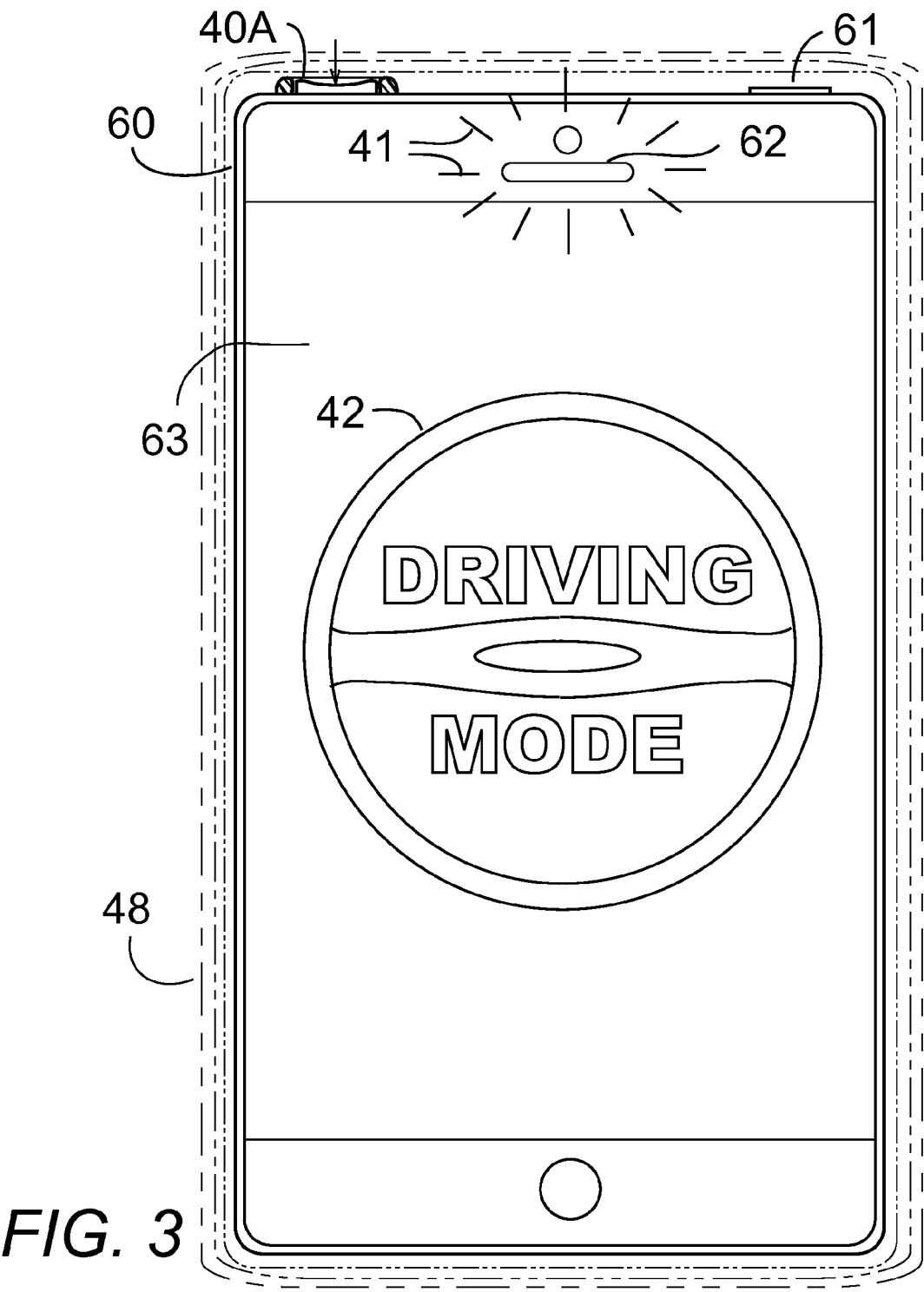
Figure 4:
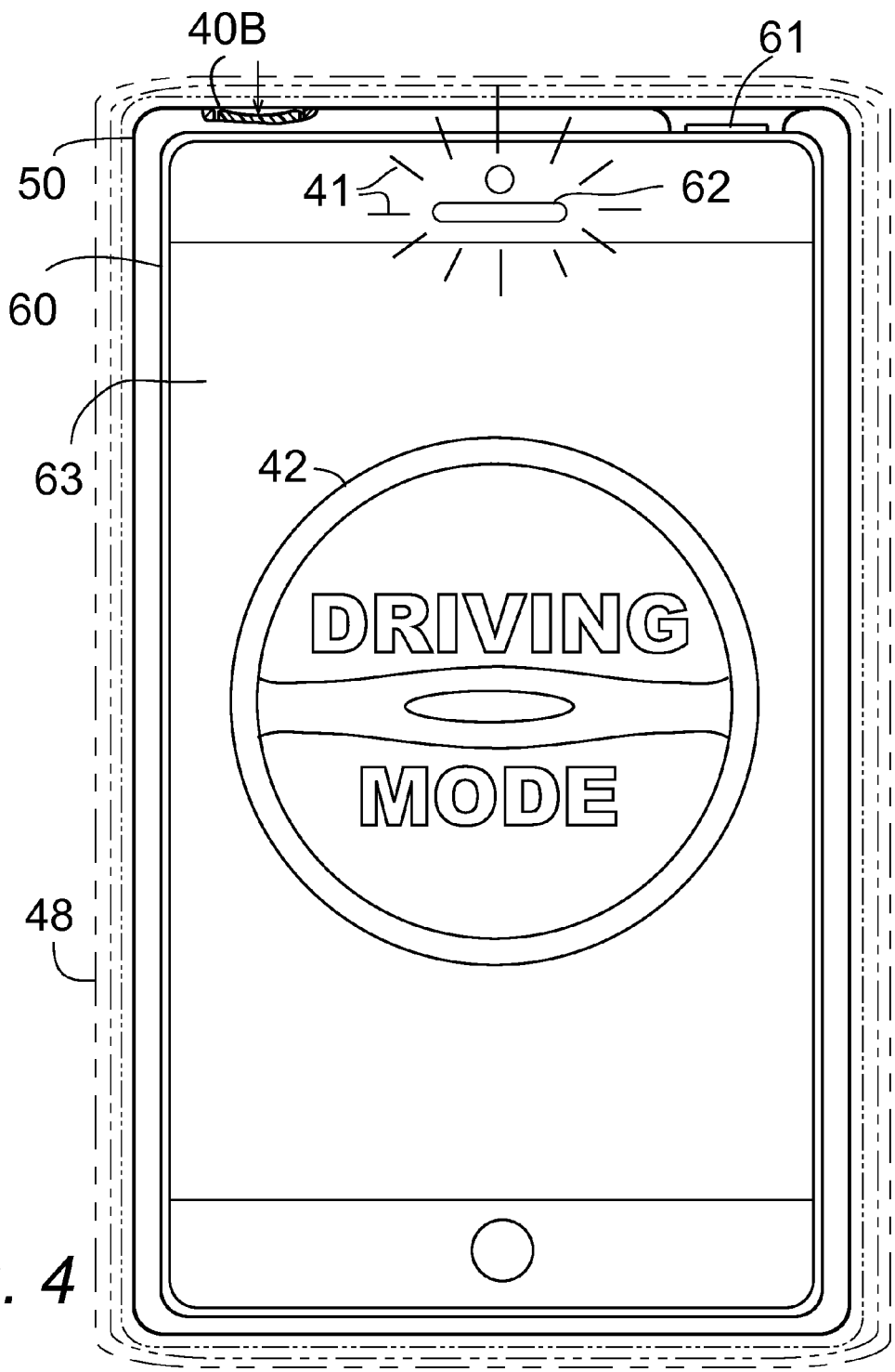
FIG. 4 is an elevational view of the front screen face of the cellular phone showing the recessed activation button for the app of the present invention built into the top of the case containing the cellular phone and showing the various types of notifications that the app is turned on in the driving mode.
Figure 5:
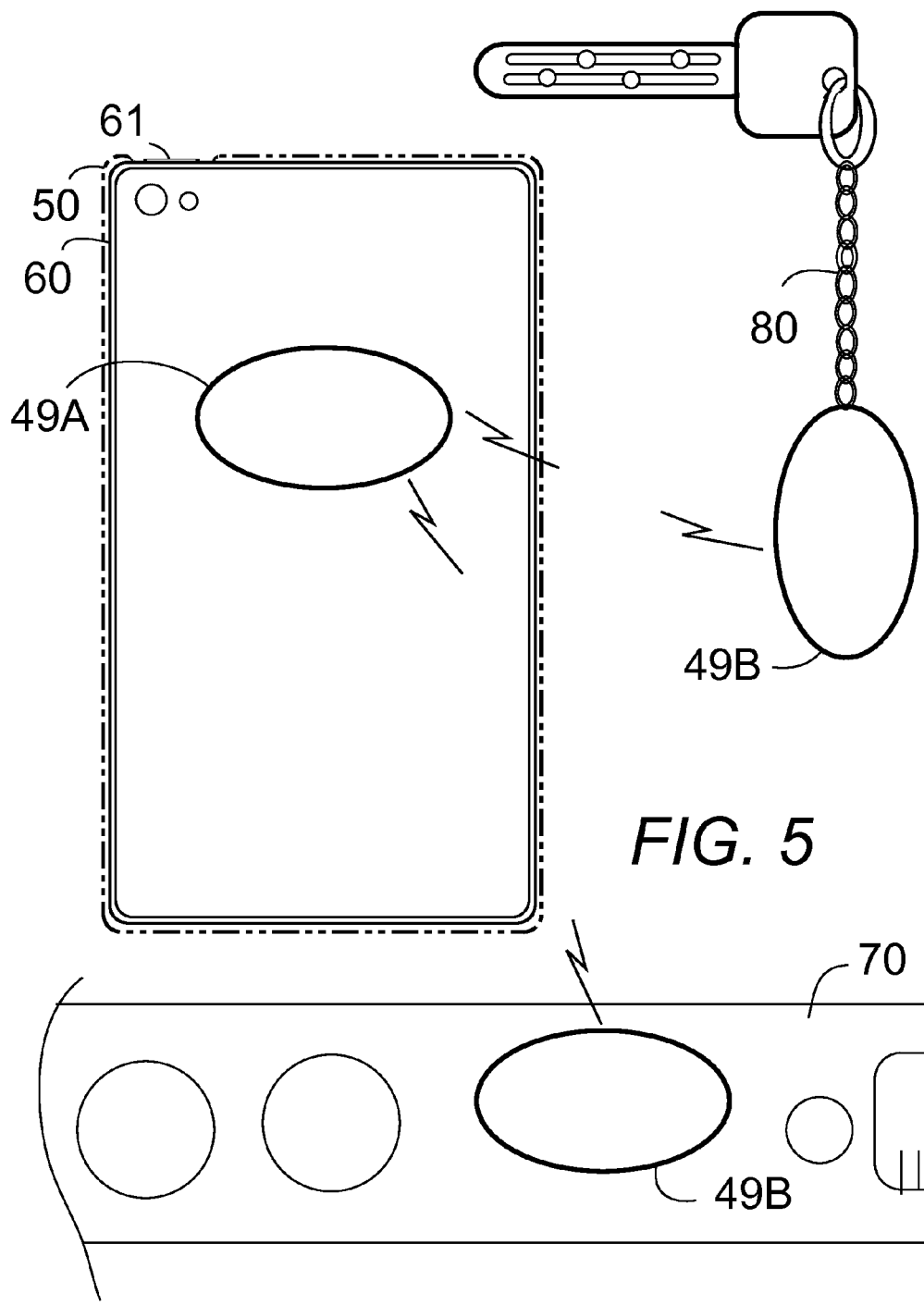
FIG. 5 is an elevational view showing a swiping device attached to a back surface of the cellular phone or a back surface of the case containing the cellular phone and showing a keychain with a mating swiping device and a vehicle dashboard with a mating swiping device for swiping the back of the cellular phone over the mating swiping device on either the keychain or the vehicle dashboard for activating the app of the present invention using radio frequency technology between the swiping devices to turn it on in the driving mode.

In FIGS. 2-4, any of a variety of means for indicating to the driver that the "driving can't text" app is turned on in the driving mode. The means for indicating to the driver that the "driving can't text" app is turned on in the driving mode comprises at least one indication means taken from the list of indication means including a sound indication 41 through at least one cellular phone microphone 62, which sound indication may include at least one sound indication taken from a list of sound indications including a simulated spoken indication, a recorded voice indication, at least one tone, at least one musical passage, or other sound indication; a visual indication 42 on the cellular phone screen 63 which may include at least one visual indication including a symbol, a light indication, a visual worded indication, or other visual indication; and at least one vibrational indication 48.

The app of the present invention further comprises programmed means for recognizing a received text message to the cellular phone and recognizing an identity of a sender of the received text message without interfering with the normal operation of the cellular phone for receiving a text message.

The app of the present invention further comprises automatic programmed means for sending an automatic pre-programmed response text message to reply to a sender of a received text message immediately when the received text message is received on the driver's cellular phone to notify the sender of the received text message that the driver is driving and can't text while driving in a "driving can't text" automatic response text message, the automatic response text message requiring no action by the driver and eliminating the need for the driver to respond immediately to the received text message since the automatic response text message has already been sent to the sender. Other response text messages may be incorporated in the app and the option of allowing a user to input the user's own desired pre-programmed response text messages is also built into the app.

Figure 6:
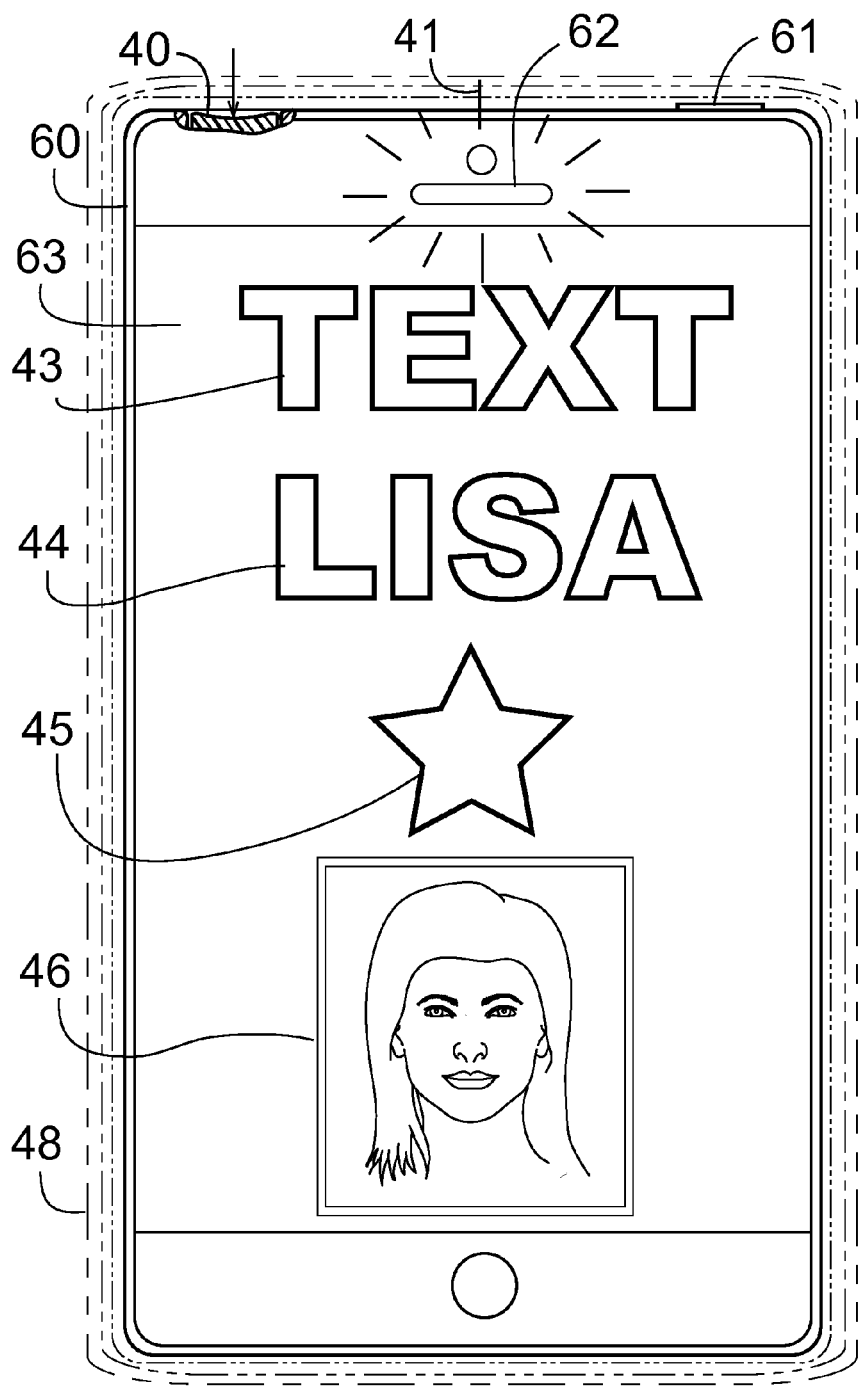
FIG. 6 is an elevational view of a front screen face of a cellular phone showing the recessed activation button for the app of the present invention built into the top of the cellular phone and showing the various types of notifications that a text message has been received on the cellular phone, and indicating the sender of the text message by at least one of a variety of possible notification means.

In FIG. 6, any of a variety of means for notifying the driver that a text message was received and that an automatic response text message was sent to the sender of the received text message, and any of a variety of means for notifying the driver of an identity of the sender of the received text message. The means for notifying the driver that a text message was received and that an automatic response text message was sent to the sender of the received text message comprises at least one of the notification means taken from the list of notification means including at least one large visual 43 on the cellular phone screen 63 which may be a message written in large type on the cellular phone screen, at least one sound 41, which may be a verbal message, sound message, tone message, musical message transmitted over at least one of the listening or speaker means 62 on the cellular phone 60, or vibration 48 of the cellular phone 60. The means for notifying the driver of an identity of the sender of the received text message comprises at least one of the notification means taken from the list of notification means including at least one large visual on the cellular phone screen 45 such as a unique symbol which may be a star, a message 44 written in large type on the cellular phone screen 63 which may be a name or other identifier of the sender, a large photo image 46 of the sender, at least one sound 41, which may be a recognizable identifying verbal message, sound message, tone message, musical message transmitted over at least one of the listening or speaker means 62 on the cellular phone 60; vibration 48 of the cellular phone 60; or other notifying means.

Programmed separately from the cellular phone operations, the app utilizes programmed means for independent functioning of the "driving can't text" app without interfering with the normal functioning of the driver's cellular phone to allow full use of the driver's cellular phone as needed and as judged safe by the driver, preferably after the driver has stopped driving, the "driving can't text" app providing an immediate response text message to the sender, thereby eliminating the need for any immediate action by the driver.

In FIG. 1B, the means for activating a programmed "driving can't text" application (app) on a driver's cellular phone to put the app in a driving mode may be turned on after a text message has been received on the cellular phone, and the system immediately activates the means for recognizing a received text message to the cellular phone and recognizing an identity of a sender of the received text message and the subsequent means for responding to the received text message.

In use, in FIG. 1A, a non-intrusive programmed application (app) method 20 of the present invention is provided for a cellular phone of a driver to eliminate a need for the driver to respond to a received text message while driving, the method not interfering with the normal functioning of the cellular phone.

The method comprises the following steps: A first step 21 comprises activating a programmed "driving can't text" application (app) on a driver's cellular phone to put the app in a driving mode to eliminate a need for a driver to respond to a received text message while driving, the app not interfering with the normal operation of the cellular phone. The first step 21 is carried out using a method for activating a programmed "driving can't text" application (app) on a driver's cellular phone to put the app in a driving mode comprising at least one activation method taken from the list of activation methods 10 including pressing a tension press recessed button built into the cellular phone 11, pressing a tension press recessed button attached to the cellular phone 12, pressing a tension press recessed button on a cellular phone case 13, pressing a timed touch virtual button on a cellular phone screen 14, swiping a swipe activation device attached to the cellular phone swiped by a mating swipe activation device on a dashboard 15, swiping a swipe activation device attached to the cellular phone swiped by a mating swipe activation device on a keychain 16.

A second step 22 comprises indicating to the driver that the "driving can't text" app is turned on in the driving mode. The second step 22 of indicating to the driver that the "driving can't text" app is turned on in the driving mode comprises the app program activating at least one indication method taken from the list of indication methods including transmitting a sound indication 41 on at least one sound transmitter 62 of the cellular phone, transmitting a simulated spoken indication sound 41 on at least one sound transmitter 62 of the cellular phone, transmitting a recorded voice indication sound 41 on at least one sound transmitter 62 of the cellular phone, displaying on the cellular phone screen a visual symbol indication 42, displaying on the cellular phone screen a light indication, displaying on the cellular phone screen a visual worded indication, and producing in the cellular phone a vibrational indication 48.

A third step 23 comprises recognizing a received text message to the cellular phone and the recognizing an identity of the sender of the received text message without affecting the control of the cellular phone or any of its functions.

A fourth step 24 comprises sending an automatic pre-programmed response text message to reply to a sender of a received text message immediately when the received text message is received on the driver's cellular phone to notify the sender of the received text message that the driver is driving and can't text while driving in a "driving can't text" automatic response text message, the automatic response text message requiring no action by the driver and eliminating the need for the driver to respond immediately to the received text message since the automatic response text message has already been sent to the sender. Other pre-programmed response text messages may be incorporated into the app and an option for a user to input any desired pre-programmed response text message is also programmed into the app.

A fifth step 25 comprises notifying the driver that a text message was received thereby confirming that an automatic response text message was sent to the sender of the received text message and notifying the driver of the identity of the sender of the received text message. In FIG. 6, the fifth step 25 of notifying the driver that a text message was received and that an automatic response text message was sent to the sender of the received text message comprises carrying out at least one of the notification methods taken from the list of notification methods including displaying at least one large visual 43 on the cellular phone screen 63 such as displaying a message written in large type on the cellular phone screen or displaying a symbol or image, transmitting at least one sound 41 transmitted over at least one of the speakers or listening means 62 on the cellular phone, which may be transmitting a verbal message, causing a vibration 48 of the cellular phone or other message notification means. Notifying the driver of the identity of the sender of the received text message comprises carrying out at least one of the notification methods taken from the list of notification methods including displaying at least one large visual 44, 45, or 46 on the cellular phone screen 63, such as displaying a message 44 written in large type on the cellular phone screen, displaying a large photo image 46 of the sender, displaying a symbol 45 identifying the sender, transmitting at least one sound 41 transmitted over at least one of the speakers or listening means 62 on the cellular phone, which may be transmitting a verbal message, tone, music or other audible signal, causing a vibration 48 of the cellular phone.

The steps of the method are carried out by independent functioning of the "driving can't text" app without interfering with the normal functioning of the driver's cellular phone to allow full use of the driver's cellular phone as needed and as judged safe by the driver, preferably after the driver has stopped driving, the "driving can't text" app providing an immediate response text message to the sender, thereby eliminating the need for any immediate action by the driver.

In FIG. 1B, the method comprises carrying out the first step of activating the app after a text message has already been received on the cellular phone so that the third, fourth, fifth and sixth steps immediately follow after the first step.

It is understood that the preceding description is given merely by way of illustration and not in limitation of the invention and that various modifications may be made thereto without departing from the spirit of the invention as claimed.

What is claimed is:

1. A programmed application (app) system on a cellular phone of a driver to eliminate a need for the driver to respond to a received text message while driving, the app system programmed separately from the cellular phone operations not interfering with the normal functioning of the cellular phone, the system comprising:

driver actuated means for activating a programmed "driving can't text" application (app) on a driver's cellular phone to put the app in a driving mode to eliminate a need for a driver to respond to a received text message while driving, the app programmed separately from the cellular phone operations to prevent interfering with the normal operation of the cellular phone;

driver perceivable means for indicating to the driver that the "driving can't text" app is turned on in the driving mode;

programmed means for sending an automatic pre-programmed response text message to reply to a sender of a received text message immediately when the received text message is received on the driver's cellular phone in the driving mode to notify the sender of the received text message that the driver is driving and can't text while driving in a "driving can't text" automatic response text message, the automatic response text message requiring no action by the driver and eliminating the need for the driver to respond immediately to the received text message since the automatic response text message has already been sent to the sender;

programmed means for notifying the driver that a text message was received and that an automatic response text message was sent to the sender of the received text message;

programmed means for independent functioning of the "driving can't text" app without interfering with the normal functioning of the driver's cellular phone to allow full use of the driver's cellular phone as needed and as judged safe by the driver, preferably after the driver has stopped driving, the "driving can't text" app providing an immediate response text message to the sender, thereby eliminating the need for any immediate action by the driver.

2. The system of claim 1 wherein the driver actuated means for activating a programmed "driving can't text" application (app) on a driver's cellular phone to put the app in a driving mode is turned on after a text message has been received on the cellular phone and the system immediately activates the programmed means for sending an automatic pre-programmed response text message to reply to a sender of a received text message.

3. The system of claim 1 wherein the driver actuated means for activating a programmed "driving can't text" application (app) on the driver's cellular phone to put the app in a driving mode comprises at least one activation means taken from the list of activation means including a built-in tension press recessed button built into the cellular phone, a phone-attached tension press recessed button attached to the cellular phone, a case-attached tension press recessed button on a cellular phone case, a timed touch virtual button on a cellular phone screen, a swipe activation device attached to the cellular phone swiped by a mating radio frequency technology swipe activation device on a dashboard, a swipe activation device attached to the cellular phone swiped by a mating radio frequency technology swipe activation device on a keychain.

4. The system of claim 1 wherein the programmed means for indicating to the driver that the "driving can't text" app is turned on in the driving mode comprises at least one indication means taken from the list of indication means including a sound indication through at least one cellular phone microphone, which sound indication may include at least one sound indication taken from a list of sound indications including a simulated spoken indication, a recorded voice indication, at least one tone, and at least one musical passage; a visual indication on the cellular phone screen which may include at least one visual indication including a symbol, a light indication, and a visual worded indication; and at least one vibrational indication.

5. The system of claim 1 wherein the programmed means for notifying the driver that a text message was received and that an automatic response text message was sent to the sender of the received text message comprises at least one of the notification means taken from the list of notification means including at least one large visual on the cellular phone screen, a message written in large type on the cellular phone screen, at least one sound transmitted over at least one listening means on the cellular phone, a verbal message transmitted over at least one of the listening means on the cellular phone, vibration of the cellular phone.

6. The system of claim 1 wherein the programmed means for notifying the driver of an identity of the sender of the received text message comprises at least one of the notification means taken from the list of notification means including at least one large visual on the cellular phone screen, a message written in large type on the cellular phone screen, a large photo image of the sender, at least one sound transmitted over at least one listening means on the cellular phone, a verbal message transmitted over at least one of the listening means on the cellular phone, and vibration of the cellular phone.

7. A method for eliminating a need for a driver to respond to a received text message while driving using a programmed application (app) system on the driver's cellular phone programmed separately from the cellular phone operations, the method not interfering with the normal functioning of the cellular phone, the method comprising:
   a first step of activating a programmed "driving can't text" programmed application (app) on a driver's cellular phone to put the app in a driving mode to eliminate a need for a driver to respond to a received text message while driving, the app programmed separately from the cellular phone operations net to prevent interfering with the normal operation of the cellular phone;
   a second step of indicating to the driver that the "driving can't text" app is turned on in the driving mode;
   a third step of sending an automatic pre-programmed response text message to reply to a sender of a received text message immediately when the received text message is received on the driver's cellular phone to notify the sender of the received text message that the driver is driving and can't text while driving in a "driving can't text" automatic response text message, the automatic response text message requiring no action by the driver and eliminating the need for the driver to respond immediately to the received text message since the automatic response text message has already been sent to the sender;
   a fourth step of notifying the driver that a text message was received thereby confirming that an automatic response text message was sent to the sender of the received text message;
   wherein the steps of the method are carried out by independent functioning of the "driving can't text" app without interfering with the normal functioning of the driver's cellular phone to allow full use of the driver's cellular phone as needed and as judged safe by the driver, preferably after the driver has stopped driving, the "driving can't text" app providing an immediate response text message to the sender, thereby eliminating the need for any immediate action by the driver.

8. The method of claim 7 comprising carrying out the first step of activating the app after a text message has already been received on the cellular phone immediately activating the programmed means for sending an automatic pre-programmed response text message to reply to a sender of a received text message.

9. The method of claim 7 wherein the first step is carried out using a method for activating a programmed "driving can't text" application (app) on a driver's cellular phone to put the app in a driving mode comprising at least one activation method taken from the list of activation methods including pressing a tension press recessed button built into the cellular phone, pressing a tension press recessed button attached to the cellular phone, pressing a tension press recessed button on a cellular phone case, pressing a timed touch virtual button on a cellular phone screen, swiping a swipe activation device attached to the cellular phone swiped by a mating swipe activation device on a dashboard, swiping a swipe activation device attached to the cellular phone swiped by a mating swipe activation device on a keychain.

10. The method of claim 7 wherein the second step of indicating to the driver that the "driving can't text" app is turned on in the driving mode comprises at least one indication method taken from the list of indication methods including transmitting a sound indication on at least one sound transmitter of the cellular phone, transmitting a simulated spoken indication on at least one sound transmitter of the cellular phone, transmitting a recorded voice indication on at least one sound transmitter of the cellular phone, displaying on the cellular phone screen a visual symbol indication, displaying on the cellular phone screen a light indication, displaying on the cellular phone screen a visual worded indication, and producing in the cellular phone a vibrational indication.

11. The method of claim 7 wherein the fourth step of notifying the driver that a text message was received and that an automatic response text message was sent to the sender of the received text message comprises carrying out at least one of the notification methods taken from the list of notification methods including displaying at least one large visual on the cellular phone screen, displaying a message written in large type on the cellular phone screen, transmitting at least one sound transmitted over at least one of the listening means on the cellular phone, transmitting a verbal message transmitted over at least one of the listening means on the cellular phone, causing a vibration of the cellular phone.

12. The method of claim 7 wherein the step of notifying the driver of the identity of the sender of the received text message comprises carrying out at least one of the notification methods taken from the list of notification methods including displaying at least one large visual on the cellular phone screen, displaying a message written in large type on the cellular phone screen, displaying a large photo image of the sender, transmitting at least one sound transmitted over at least one of the listening means on the cellular phone, transmitting a verbal message transmitted over at least one of the listening means on the cellular phone, and causing a vibration of the cellular phone.

13. The system of claim 1 further comprising programmed means for recognizing a received text message to the cellular phone and recognizing an identity of a sender of the received text message.

14. The system of claim 13 further comprising programmed means for notifying the driver of an identity of the sender of the received text message.

15. The method of claim 7 further comprising the step of recognizing a received text message to the cellular phone and recognizing an identity of a sender of the received text message.

16. The method of claim 15 further comprising the step of notifying the driver of an identity of the sender of the received text message.

* * * * *